3,031,442
NITROGEN BASE CATALYZED DISPLACEMENT REACTIONS OF ALLYLIC TERPENE HALIDES
Robert L. Webb, Jacksonville, Fla., assignor to The Glidden Company, Cleveland, Ohio, a corporation of Ohio
No Drawing. Filed Sept. 15, 1958, Ser. No. 760,855
27 Claims. (Cl. 260—97.5)

This invention is concerned with converting organic halides derived from terpenes to the corresponding acyloxy compounds by treatment of the chlorides with salts of carboxylic acids. It is more particularly concerned with improvements in the conversion of terpenic allylic chlorides to the corresponding esters by treating them with salts of carboxylic acids in the presence of nitrogen bases and/or their salts.

It is known to produce terpenic allylic chlorides in several ways such as:

(A) Addition of hydrogen chloride to the conjugate system of a terpene. Myrcene thus yields linalyl and geranyl chloride when treated with one mole of hydrogen chloride and further treatment with a second mole of HCl yields 2-chloro-dihydro linalyl and 2-chloro-dihydro geranyl chlorides. See copending appication Serial No. 760,854, filed September 15, 1958. Alloocimene and ocimene also yield allylic chlorides on treatment with hydrogen chloride as do α-terpinene, phellandrenes, the pyronenes and p-menthdiene-2,4(8). Also dehydroterpenes containing a conjugate system of double bonds such as verbenene, dehydrophellandrenes and dehydromyrcene readily add hydrogen chloride (bromide) to yield allylic terpenic chlorides (bromides).

(B) Terpenes can be chlorinated to produce allylic chlorides. Thus α-pinene yields pinocarvyl chloride, limonene yields carvyl chloride, carvomenthene yields carvotanacetyl chloride, myrcene yields 3-chloro-2-methyl-6-methylene-1, 7-octadiene, 3-menthene yields 5-chloro-3-menthene. Alloocimene yields an allylic chloride, 3-chloro-2,6-dimethyl-1,4,6-octatriene. Dihydro and tetrahydro myrcene and alloocimene likewise yield allylic chlorides as do α-terpinene, gamma-terpinene, terpinolene and the pyronenes and dihydro pyrones and other cyclohexadienes resulting from cyclization of alloocimene. Bromides are analogously produced through brominations of the hydrocarbons. In general, any terpene, dihydro or tetrahydroterpene, containing one or more double bonds may be chlorinated or brominated to yield a reactive allylic halide. For the purpose of this specification, a terpene is defined as a hydrocarbon containing 10 carbon atoms in an unbroken chain. A terpenic allylic halide is intended to mean a terpenic allylic chloride, bromide or iodide.

Terpenic allylic chlorides can, of course, also be prepared by treatment of substituted hydrocarbons. Thus, alpha terpineol, which can be considered 8-hydroxy-carvomenthene halogenates to 8-hydroxy-carvotanacetyl chloride, and alpha terpinyl chloride chlorinates to form 8-chloro-carvotanacetyl chloride. The terpenic allylic chloride can contain two allylic groups such as the product resulting from chlorination of geranyl chloride or geraniol.

Allylic terpenic halides are therefore readily available from a wide choice of terpene and hydroterpene raw materials. These allylic halides are valuable intermediates for producing allylic esters and alcohols of the terpenic class and which find use as valuable perfumery ingredients and for flavor. Thus, allylic chlorides mentioned above will yield, when treated with salts of carboxylic acids, esters of terpene alcohols which are valuable per se and as the free alcohols produced on saponification. Myrcene hydrohalides are the source of geraniol and linalool while compounds of the spearmint series may be obtained from carvyl chloride and compounds of the peppermint series from 5-chloro-3-p-menthene.

Unfortunately, although terpenic allylic chlorides are relatively reactive compared with terpenic non-allylic chlorides, their conversion to the corresponding esters by heating them with salts of carboxylic acids according to prior art procedures leaves much to be desired. The reactions to form esters are relatively slow and yields are poor. Many of the allylic chlorides are relatively unstable thus leading to dehydrohalogenation during treatments according to the prior art. Attempts to speed up the reaction between the halide and the salt of the carboxylic acid by heating intensifies the problem of dehydrohalogenation. Further, linalyl/geranyl/neryl chlorides tend to cyclize readily to terpinyl chloride. Further, linalyl/geranyl/neryl esters are not very stable and tend to cyclize and split out the carboxylic acid under the vigorous reaction conditions which must be applied using prior art methods to force the allylic chloride to react competely with the carboxylic acid salt in a reasonable length of time.

It is, accordingly, an object of this invention to provide an improved method for reacting terpenic allylic halides with salts of carboxylic acids to produce terpenic allylic esters.

Another object is to provide catalysts for reacting terpenic allylic halides with salts of carboxylic acids.

Another object is to provide a method for obtaining high yields of terpenic allylic esters and alcohols.

In conducting the process of my invention, an allylic terpene halide is treated with a salt of a carboxylic acid in the presence of a nitrogen base catalyst or its salt which also acts as catalyst. By a nitrogen base, I mean a compound containing nitrogen which can add an HX, where X is a halide, and can be regenerated by removal of the HX group. The nitrogen base salt can also be used. Also, I can use as the displacement reagent and catalyst, the reaction product of an organic carboxylic acid and a nitrogen-containing compound, e.g. triethylammonium acetate or ammonium acetate, the amine salt of a carboxylic acid, etc. The term "N-substituted compound" can be used for a nitrogen atom containing at least one organic radical attached thereto.

As an example of the process of my invention, geranyl chloride is treated with a slight molar excess of sodium acetate at 85 to 90° C. for eight hours in the presence of at least a catalytic quantity of a nitrogen base such as 1% triethylamine (based on the weight of geranyl chloride) whereupon geranyl acetate is produced in high yield, as high, say, as 75–95% of theory. In the absence of the nitrogen base catalyst, and otherwise under the same conditions, the yield of geranyl acetate would be only 15 to 25% at best and would never approach the yield of the catalyzed reaction even when treated for much longer periods. More hydrocarbons would be produced through dehydrochlorination and also more undesired cyclization products would result when the treatment is made in absence of the nitrogen base/salt catalysts.

The terpenic allylic chloride can be acylic, monocyclic or bicyclic. Each type is subject to catalysis by nitrogen bases and their salts in their reaction with carboxylic acid salts.

The molar ratio of terpenic allylic halide to the salt of the carboxylic acid is not critical, but I prefer to employ about one to two equivalents of the carboxylic acid salt per mole of allylic halide.

Solvents are not required except to the extent that they facilitate agitation of the halide with a solid salt. Any inert hydrocarbon solvent such as napthas, lower aromatics or saturated halide solvents are suitable as would be ethers, ketones, lower fatty acids corresponding to the ester desired, etc. The lower fatty acids are not truly inert solvents, however, as large proportions depress the catalyst activity to the extent shown by the examples.

Agitation is not essential but is preferred to maintain good contact where two phases are present as is usually the case though not necessarily.

The nitrogen-base catalyzed reaction of the halide and the salt takes place slowly even at room temperature, but I prefer to use somewhat higher temperatures such as 60 to 110° C. Higher temperatures provide faster reaction rates, but at temperatures over 120° C. undesirable dehydrochlorination may take place if the allylic chloride is an unstable one, and since reaction rates are good at temperatures of 80 to 100° C., I frequently choose this temperature range without specifically investigating the thermal stability of the allylic halide. As a rough estimate of order of reaction rates, the time required for the reaction may vary from, say 40 or 50 hours at 50 to 60° C. to less than one hour at 110 to 120° C. Under such conditions the undesirable dehydrohalogenation reaction is kept to a minimum and ester yields are high. These are, of course, only general considerations since reaction kinetics would differ from compound to compound within the classes under discussion and with the identity and quantity of catalyst also.

As catalysts I employ nitrogen bases or their salts. The nitrogen base can be ammonia, amines, amidines, amides, oximes, hydroxyl amine, hydrazones, semicarbazides, imines and the like. The amines can be primary, secondary or tertiary and can be alkyl, aryl or heterocyclic. In the course of the reaction they may be alkylated by the reactive allylic halides to some unknown degree. They can be relatively volatile or non-volatile. They can consist of the elements carbon, hydrogen and nitrogen only or can contain other elements such as oxygen or chlorine. They can be added as such to the terpenic allylic chloride and salt of the carboxylic acid or can even be generated in-situ as by reduction of a nitro compound or by thermal decomposition of unstable quaternaries. They can be added as free amines or as their salts. The salt, if a salt of a mineral acid, presumably reacts with the salt of the carboxylic acid present to produce the amine salt of the carboxylic acid but regardless of the true mechanism even salts such as ammonium chloride or ammonium acetate are effective catalysts. It may also be that the allylic chloride alkylates ammonia or the other nitrogen base to form a nitrogen base containing the allylic group corresponding to the allylic halide undergoing reaction and that this new allylic nitrogen base also acts as catalyst. I have found, however, that when an amine such as triethylamine is used as catalyst, it can be recovered in good yield, if desired, from the reaction mixture when the reaction mixture is saponified to convert the ester to alcohol. In this case, the amine can be recovered by distillation.

Although rare and expensive nitrogen bases can be used as catalysts it is not necessary to do so and a suitable base can be chosen from those which are readily available, inexpensive, easy to handle and safe to handle. Among these effective and economic nitrogen bases are the inexpensive aliphatic amines, notably triethylamine, triethanolamine and the like. Triethylamine is readily recovered while the ethanolamines are less conveniently recoverable.

Any carboxylic acid salt can be employed to form the corresponding ester of the allylic terpenic alcohol. The reagent salt can be an amine salt in which case it is not necessary to add a separate catalyst as the amine salt reagent acts as catalyst. The amine salt can be produced prior to mixing with the halide or the halide plus acid can be treated with ammonia or an amine. If a metallic salt is used the metal may be of the alkali or alkali earth group or even lead, nickel, copper, manganese, etc. Certain salts such as aluminum acetate, cupric acetate and nickelous formate may yield only polymer in absence of the nitrogen base, perhaps because their halides formed on reaction act as polymerization catalysts for the allylic chloride or its esters but in the presence of sufficient nitrogen base, this undesirable catalytic effect can be suppressed. While expensive metal salts can be used, it is not necessary to employ them and to contend with the special problems that may result from their use such as the polymerization effect described, or with the special recovery problems generated through their use. Sodium, potassium and ammonium and alkyl ammonium salts work well and are cheap and, therefore, I like to employ them. An important consideration in choosing the salt is related to the recovery problem. Thus, if I wish to produce an alcohol, I can choose to react sodium acetate with the alkyl halide so that the ester produced can be washed to remove sodium halide and sodium acetate excess and then can be saponified with caustic soda solution. The saponified oil may be separated from the aqueous alkaline sodium acetate solution by decantation or by steam distillation. The aqueous sodium acetate solution can be crystallized or excess alkali may simply be neutralized with acetic acid and evaporated to dryness. Such recovery of the salt of the carboxylic acid is obviously simple and economic where sodium acetate is the salt in question. Alternate and more expensive recovery methods would have to be applied to recovery of certain other salts, for example, potassium chloracetate, where the carboxylic acid is unstable with respect to saponification and evaporation or to say lead salts where the metal hydroxide is not readily water soluble.

All carboxylic acid salts I have tested in studying my invention, are operable to yield the desired allylic terpenic ester and all these reactions are catalyzed by nitrogen bases. I have employed salts of the lower and higher fatty acids, aromatic acids, polycarboxylic acids, heterocyclic acids, hydroxy acids, chloracids, and amino acids to show that the identity of the carboxylic acid is not critical. I can employ partly neutralized or fully neutralized acids, thus, potassium acid phthalate or dipotassium phthalate or lower fatty acids can be partly neutralized as with ammonia. It is necessary only to have sufficient salt present to furnish carboxylic groups for reaction with the halide. Since sodium acetate is cheap, effective, readily available and easily recoverable, I may prefer to employ it if my object is consistent with its use. Thus, if I wish to produce geraniol or geranyl acetate, I will react geranyl chloride with sodium acetate in the presence of the nitrogen base or its salt. If, however, I wish to produce geranyl isovalerate, I can choose to employ sodium isovalerate and obtain pure geranyl isovalerate by fractionation of the crude reaction product rather than to produce the acetate, saponify, fractionate the geraniol, esterify it with isovaleric acid and finally fractionate it.

Also, if I wish to produce a choride-free alcohol, I can choose to react the terpenic allylic halide with a higher fatty or other acid salt which will produce a relatively non-volatile ester from which the undesirable by-product organic halides in the crude reaction product can be stripped by dry or steam distillation. The non-volatile ester thus freed of halides can then be saponified to yield halide-free alcohol. Alternatively, I can employ say, sodium acid phthalate, thereby producing a terpenic allylic half ester of a polycarboxylic acid whose salts are water soluble and are therefore separable from the water-insoluble impurities in the crude reaction products. The so purified half ester on saponification yields the pure alcohol. Also, certain half esters are crystalline and recrystallization of the half ester affords an additional method of purification. Thus, trans-3-menthene-5-yl acid phthalate is crystalline and readily recrystallizable. I have prepared halogen-free 3-menthene-5-ol by saponification of the half ester and have hydrogenated it easily to isomenthol whereas, when the crude ester was saponified and the alcohol purified only by careful distillation, I found the hydrogenation catalyst poisoned by accompanying traces of chlorides.

It is evident then that there exist various reasons for choosing one carboxylic acid salt over the other depending upon the ultimate utility of the product produced. The choice is very largely to be made on the overall economics that obtain both with respect to reagent cost and overall processing cost, to provide the final ester or the corresponding alcohol.

Linalyl chloride does not undergo displacement reaction as readily as geranyl (or neryl) chloride, catalyzed or not. The present invention is, therefore, concerned primarily with production of the primary alcohol esters, geranyl and neryl, rather than with linalyl esters, though as shown in the examples, appreciable and valuable quantities of linalyl esters are produced. Also, it is evident from this that I prefer to employ myrcene hydrochloride rich in geranyl/neryl chloride. In copending application, Serial No. 760,875, filed September 15, 1958, it is shown that geranyl (neryl) chloride is produced in high yield by hydrochlorinating myrcene in the presence of cuprous chloride and isomerizing the linalyl chloride produced to geranyl (neryl) chloride. In copending application, Serial No. 760,844, filed September 15, 1958, it is shown that linalyl or geranyl (neryl) chloride is converted in high yield to esters which are predominately linalyl when these chlorides are reacted in acid systems with cuprous chloride as catalyst and in the presence of a base capable of neutralizing the hydrogen chloride produced on hydrolysis. Thus, geranyl or neryl or linalyl chlorides or mixtures of these can be dissolved in an organic acid such as acetic along with a small amount, say 0.5%, of cuprous chloride and hydrogen chloride will be formed in solution. The reaction does not go to completion, however, until sufficient base, say sodium acetate or ammonium acetate or other carboxylic acid salt is added to neutralize the liberated HCl at which time the reaction continues to completion to give a high yield of linalyl ester.

I have found that if I hydrochlorinate myrcene in the presence of cuprous chloride in practicing the invention of copending application, Serial No. 760,875, referred to above, there may remain suspended or dispersed in the resulting crude hydrochloride enough cuprous chloride to effect the solvolytic production of linalyl ester according to the invention described in copending application, Serial No. 760,844, also referred to above. Since cuprous chloride can thus be present in myrcene hydrochloride and is a catalyst for linalyl ester production, and whereas the present invention, with respect to myrcene hydrochloride, is concerned chiefly with geranyl ester production through amine catalysis, it is evident that these reactions may compete with each other in a reaction system where conditions are favorable for both types of catalysis. Thus, while in acetic acid solution, cuprous chloride causes dominately linalyl ester production, even if a little nitrogen base salt is present and while in a definitely basic system, such as is present when myrcene hydrochloride is treated with sodium acetate and an amine, the nitrogen base causes preponderately geranyl ester formation even if a little cuprous chloride is present, there are reaction conditions whereby both types of catalysis take place so that the ester produced is rich in both linalyl and geranyl esters. These intermediate reaction conditions, between definite basicity and definite acidity, and which are difficult to define since pH is not measurable in such non-aqueous reaction systems, can be illustrated by reactions of myrcene hydrochlorides with ammonium acetate in the presence of cuprous chloride. Here, ammonium acetate plays both a catalytic role as a nitrogen base salt in favoring geranyl ester formation and the role of a reagent as a salt of a carboxylic acid. However, the basicity of the ammonium acetate is such that the cuprous chloride, if present, is not inactivated and catalyzes the formation of linalyl ester so that the reaction product contains both the linalyl and geranyl ester. Also, depending on its preparation, the myrcene hydrochloride may contain more or less free hydrogen chloride and it is evident that such free mineral acid will cause liberation of carboxylic acid when added to a salt of a carboxylic acid and if cuprous chloride is also present, then linalyl ester formation will be encouraged unless the nitrogen base added to catalyze geranyl ester formation is present in quantity sufficient to greatly reduce or overcome the acidity engendered and/or destroy the effectiveness of cuprous chloride present.

As little as 0.1% of triethylamine will cause the catalysis responsible for formation of a high ratio of geranyl/linalyl compounds if cuprous chloride is absent and the hydrochloride is free of a substantial amount of acidity. To achieve maximum yield of geranyl ester and to avoid formation of much linalyl esters, the hydrochloride, whether produced using cuprous chloride according to copending application, Serial No. 760,875, or not, may be washed with dilute soda ash solution to remove free hydrogen chloride and if cuprous chloride is present, to destroy its activity as a linalyl ester catalyst for the subsequent conversion as described herein. In general, however, it suffices to remove most of the free hydrogen chloride from the crude hydrochloride by airblowing or by application of vacuum, say 25 inches of mercury, and then proceed to add the nitrogen base or salt catalyst, say triethyl amine, and the salt of the carboxylic acid, say sodium acetate. After the reaction mixture is heated, the ester content will then be predominantly in favor of the geranyl ester, providing geranyl rich chloride is used, that cuprous chloride is absent and there is free nitrogen base. Factors governing the ratio of the isomeric ester production are explained more fully elsewhere in this application.

Since amines are cheap and since the reaction is sensitive to acidic conditions in presence of cuprous halides and since the amine is readily recoverable, I can use 1.0 to 3.0% amine or more as catalyst thus insuring rapid reaction, a suitably non-acidic system and thereby a good yield of geranyl ester. Alternatively I can remove any cuprous compound from the system, if it is present, and then I can operate in an acidic system without fear of producing much linalyl ester. Of course, the linalyl ester is also valuable and saleable but I prefer to produce predominantly geranyl compounds if only for the reason that purification costs for the geranyl compound are minimized when I process crudes rich in the geranyl compound, and since I have discovered a superior process for producing linalyl esters as described in copending application Serial No. 760,844.

Geranyl esters are produced in good yields and good quality if an amine such as triethylamine is partially neutralized with the carboxylic acid then treated with myrcene hydrochloride or purified geranyl chloride. The amine is recovered substantially quantitatively if the reaction mixture is treated with a fixed alkali and distilled to separate the amine as distillate. The still residue is geranyl ester plus fixed alkali chloride or geraniol plus alkali chloride plus alkali carboxylic acid salt depending on the proportion of alkali used and conditions of the reaction as would be expected.

I find that the amount of nitrogen base catalyst required to provide good to optimum catalysis can vary somewhat with respect to the acidity of the system. Thus, apparently when small amounts of catalyst are employed, say 0.1 to 1%, the maximum rate of reaction will occur when the carboxylic acid present, say acetic acid, is fully neutralized, i.e., when it is a neutral salt and when the nitrogen base is free. Addition of acetic acid to this system tends to retard the reaction somewhat though this may be overcome by addition of more catalyst or other base to neutralize the added acidity. This depression of rate of reaction on adding free acid is much less noticeable when larger quantities of catalyst are used and as shown in the examples, large quantities of acid may be present if substantial quantities of nitrogen base salts are present and good results will be obtained.

The total quantity of acid present is not alone the determining factor, but the character of the excess acid is also important as to the amount of nitrogen base salt required for good reaction rates. For example, a weak acid may tend to depress the catalytic effect of the nitrogen base to a lesser extent than would a corresponding amount of stronger acid. Thus, a reaction system one molar in acetic acid and containing say 5% triethylamine and sodium acetate should react somewhat faster than a like system but one molar in chloracetic acid. Also, strong acids such as oxalic or chloracetic may cause hydrocarbon formation, polymerization and undesirable cyclization to terpineol esters. Most organic acids such as the alkanoic acids are not troublesome in this respect. Quite weak acids may show even less tendency to depress the catalytic effect. For example, in treatment of salts of dibasic acids such as phthalic, I find that the acid may be only partly neutralized since the dissociation constant of the second carboxyl is so small that the acidity of the system is not sufficient to depress the activity of the amine catalyst. Thus, in this case $K_1$ is about $1.3 \times 10^{-3}$ while $K_2$ is about $3.9 \times 10^{-6}$ (Lange's Handbook of Chemistry, ninth edition, page 1201). Triethylamine is about $5.56 \times 10^{-4}$ (same reference page 1204). The amine is therefore weak compared to the first dissociation constant, strong compared to the second. Unfortunately, these data are not subject to quantitative interpretation in the non-aqueous reaction system I employ, and I can only generalize that the weak acidity represented by the second carboxyl group of a polycarboxylic acid is not ordinarily sufficient to depress the catalytic effect of small quantities of nitrogen base catalyst to an appreciable extent. The strength of the nitrogen base might also be expected to play an important role where free acid is present. Obviously, an enormous number of amine-carboxylic acid systems could be investigated but such an effort would not be economically justifiable. It will also be appreciated that I can add more amine or other base to any particular system if I wish to make that system more alkaline or less acidic and increase the reaction rate or suppress the catalytic effect of cuprous chloride if this catalyst is present in the starting allylic chloride, and I can do so without much concern as to the increased cost of the system since I can choose an amine such as triethylamine which is easily and economically recoverable from the crude reaction product.

In general, I prefer to operate in the absence of much water as solvolysis of the allylic terpenic halide or ester will take place with production of alcohols to the extent that solvolysis reactions compete with the amine catalyzed displacement reaction. This is not particularly objectionable when small amounts of water are present such as those customarily present in chemicals of commercial purities. The object of my present invention is not to produce alcohols by solvolysis of halides, however, and therefore, I prefer to employ commercially anhydrous products containing not more than a few percent of moisture.

It is to be appreciated that the nitrogen base catalysis described herein applies only to the treatment of the allylic chlorides present in the reaction system and does not catalyze to any extent the displacement of saturated tertiary chlorides present as impurities in crude allylic chlorides produced by hydrochlorination of conjugate systems. Thus, alpha terpinyl chloride is not appreciably affected. Neither are saturated dichlorides affected such as those present in crude allylic chlorides produced by chlorination of unsaturated terpenes, as for examples, 3,4-dichloro-p-menthane produced as a byproduct of 5-chloro-3-menthene on chlorination of 3-menthene. Such saturated chlorides may be separated unchanged from the crude reaction mixtures rich in allylic terpenic ester.

While I can employ pure allylic terpenic chlorides, I prefer usually for reasons of economy, to employ cruder products from hydrohalogenations or halogenations without purification of the relatively unstable halides and then purify their oxygenated derivatives which are more stable and less corrosive.

The following examples illustrate my invention further.

EXAMPLE 1

Five hundred (500) grams of myrcene hydrochloride prepared by adding 1 mole of anhydrous HCl to one mole of myrcene (95+% by ultraviolet spectroanalysis) in the presence of 0.5% of cuprous chloride at 10 to 20° C., (about 75–80% geranyl + neryl chloride, 5–10% linalyl chloride, 10–15% terpinyl chloride plus traces of other chlorides and hydrocarbons), 310 grams of anhydrous sodium acetate and 10 grams of triethylamine were stirred at 85–90° C. for 8 hours. The reaction mixture was then washed with water to remove the unreacted sodium acetate and sodium chloride to yield 515 grams of crude ester. Chemical analysis of the crude ester indicated that it contained 8–10% chlorides and 85–90% ester. Fractionation of the crude ester through an efficient column at 1–2 mm. of mercury followed by infrared spectroanalysis of the fractions indicated that the crude ester was 3–5% hydrocarbons, 8–10% alpha terpinyl chloride, 8–10% linalyl acetate and 75–80% geranyl acetate+neryl acetate.

EXAMPLE 2

A large batch of crude myrcene hydrochloride was produced by adding to each 136 grams of pyrolyzed beta-pinene taken (2–4% beta pinene, 75% myrcene, 8–10% limonene and 3–5% polymeric material) one mole of anhydrous HCl at 15–20° C. in the presence of 0.5% of cuprous chloride based on the beta pinene pyrolysate. The hydrochlorination product was 1–3% bornyl chloride, 5–10% linalyl chloride, 55–60% geranyl chloride, 15–20% alpha terpinyl chloride, 3–5% hydrocarbons and 1–2% dichlorides. Five hundred gram portions of the hydrochlorination product were reacted with various metal salts of carboxylic acids in the presence of various amines. The conditions used and the compositions of the reaction products are listed in the following table. The reaction mixtures were all washed with water to remove the unreacted carboxylic acid salt and sodium chloride before analysis. All of the crude esters contained small amounts of hydrocarbons, bornyl chloride and polymeric material.

The total saponifiable chlorides and esters were determined by refluxing the sample (one gram) for one hour with about 25 cc. of 0.5 N–KOH. Excess alkali was titrated with standard 0.1 normal nitric acid to determine the saponification value for the sample, then the neutral solution was titrated with standard silver nitrate to determine saponified chloride. The total saponification number less the chloride saponification number equals the ester saponification number. Geranyl chloride in the crude ester was calculated from infrared analysis of the ester. Saponification of larger samples followed by cohobation of the volatile oils yielded a crude mixture of hydrocarbons, bornyl chloride (unaffected by saponification) and alcohols. This was analyzed by vapor phase chromatography to determine bornyl chloride, linallol and geraniol. From these data, the analysis of the crude ester as shown in Table I was calculated.

Comparable analytical methods were used in analyzing crude reaction mixtures whose formation is described in the other examples.

Table 1

| Percent Catalyst Used [1] | Carboxylic Acid Salt | Reaction Temp., °C | Reaction Time, hrs. | Crude Ester Wt. | Percent Total [2] Saponifiable Chloride | Percent Geranyl Chloride | Percent Linalyl Ester | Percent Geranyl+ Neryl Ester |
|---|---|---|---|---|---|---|---|---|
| 1.0 Triethylamine | Sodium Acetate | 85–90 | 8 | 518 | 12–15 | 1–2 | 5–10 | 50–55 |
| 1.0 Diisoamylamine | ----do---- | 85–90 | 8 | 514 | 15–20 | 5–8 | 5–10 | 45–50 |
| 1.0 Pyridine | ----do---- | 85–90 | 8 | 516 | 15–20 | 5–8 | 5–10 | 45–50 |
| 1.0 Diethylcyclohexylamine | ----do---- | 85–90 | 8 | 515 | 15–20 | 5–8 | 5–10 | 45–50 |
| 1.0 Piperidine | ----do---- | 85–90 | 8 | 515 | 15–20 | 5–8 | 5–10 | 40–45 |
| 1.0 Triethanolamine | ----do---- | 85–90 | 8 | 513 | 12–15 | 1–2 | 5–10 | 45–50 |
| 1.0 conc. NH₄OH | ----do---- | 85–90 | 8 | 515 | 12–15 | 1–2 | 5–10 | 45–50 |
| 1.0 Aniline | ----do---- | 85–90 | 8 | 515 | 15–20 | 5–8 | 5–10 | 40–45 |
| 0.5 Triethylamine | Potassium Acetate | 85–90 | 12 | 515 | 15–20 | 5.8 | 5–10 | 40–45 |
| 1.0 Triethylamine | Potassium Acetate | 85–90 | 8 | 515 | 12–15 | 1–2 | 5–10 | 50–55 |
| 1.0 Triethylamine | Potassium Acid Phthalate | 85–90 | 8 | 655 | 10–15 | 2–3 | 10–15 | 55–60 |
| 1.0 Triethylamine | Sodium Benzoate | 85–90 | 8 | 603 | 10–12 | 2–3 | 10–15 | 55–60 |
| 1.0 Triethylamine | Sodium Lactate | 85–90 | 8 | 558 | 10–12 | 1–2 | 10–15 | 55–60 |
| 2.0 Triethylamine | Sodium Acetate | 60–65 | 40 | 515 | 10–12 | 1–2 | 5–10 | 50–55 |
| None | ----do---- | 85–90 | 8 | | 60–65 | | 1–3 | 12–15 |

[1] Based on weight of halide.
[2] The chlorides that are saponified by refluxing one hour with an excess of .5 N KOH in methanol (bornyl chloride is not saponified using these conditions).

EXAMPLE 3

Five hundred (500) grams of alpha terpinyl chloride, prepared by hydrochlorinating limonene at 15–25° C., 310 grams of anhydrous sodium acetate and 10 grams of triethylamine were stirred at 85–90° C. for 10 hours. The reaction mixture was washed with water and dried to give 495 grams of product. Infrared spectroanalysis indicated that the product was 5–10% limonene, 5–10% alpha terpinyl acetate and 80–85% unchanged alpha-terpinyl chloride. (Note: alpha-terpinyl chloride is not an allylic chloride.)

EXAMPLE 4

Myrcene hydrobromide rich in geranyl (and neryl) bromide was prepared by bubbling one equivalent of anhydrous hydrogen bromide into myrcene (95+%) containing 0.5% by weight of cuprous chloride. The hydrobromination was carried out at 15–25° C. The hydrobromination product was 1–2% unchanged myrcene, 5–10% linalyl bromide, 10–15% alpha terpinyl bromide, 75–80% geranyl bromide plus neryl bromide. Six hundred and thirty (630) grams of myrcene hydrobromide, 310 grams of anhydrous sodium acetate and 7 grams of triethylamine were stirred at 85–90° C. for six hours. The reaction mixture was washed with water to yield 520 grams of crude acetate. Fractionation of the crude acetate through an efficient column at 1–2 mm. of mercury followed by infrared spectroanalysis of the fractions indicated that the crude acetate was 2–4% hydrocarbons, 10–12% alpha terpinyl bromide, 5–8% linalyl acetate and 78–80% geranyl acetate plus neryl acetate.

EXAMPLE 5

One mole of chlorine was reacted with 3-p-menthene at 85–90° C. to give a chlorination product that was 90–92% 5-chloro-3-para-menthene and 8–10% 3,4-dichloro-para-menthane. Five hundred (500) grams of this chlorination product, 310 grams of anhydrous sodium acetate and 10 grams of triethylamine were agitated at 85–90° C. for 8 hours. The reaction product was washed with water to give 508 grams of crude acetate. The crude acetate was fractionated through an efficient column at 5–7 mm. of mercury and the fractions were analyzed by infrared spectroanalysis. The analysis indicated that the crude acetate was 15–20% hydrocarbons, 70–75% 3-para-menthenyl-5-acetate and 8–10% 3,4-dichloro-para-menthane.

EXAMPLE 6

One mole of chlorine was added to one mole alpha-pinene at 20–25° C. in the presence of 1.25 moles of sodium bicarbonate to yield a chlorination product that was 20–25% bornyl chloride, 65–70% pinocarvyl chloride and 10–15% dichlorides. Five hundred (500) grams of this chlorination product, 310 grams of anhydrous sodium acetate and 10 grams of triethylamine were stirred at 75–80° C. for 15 hours. The reaction mixture was then washed with water to yield 509 grams of crude acetate. Infrared spectroanalysis of the crude acetate showed that it contained 10–15% hydrocarbons and dichlorides, 20–25% bornyl chloride, 55–60% pinocarvyl acetate.

EXAMPLE 7

Myrcene dihydrochloride was prepared by passing two moles of HCl into myrcene containing 0.5% by weight of cuprous chloride, at 20–25° C. (see copending application Serial No. 760,854, filed September 15, 1958). Infrared spectroanalysis of the dihydrochlorination product indicated that it was 15–20% alpha-terpinyl chloride plus dichloro-paramenthane and 80–85% 2,8-dichloro-2,6-dimethyl-6-octene. Five hundred (500) grams of the dihydrochloride, 600 grams of anhydrous sodium acetate and 10 grams of triethylamine were diluted with 500 ml. of benzene so that the mixture could be agitated easily. The reaction mixture was stirred at 75–80° C. for 10 hours. The reaction mixture was then washed with water and the benzene removed by distillation at reduced pressure to yield 503 grams of crude ester. Fractionation of the crude ester through an efficient column at 1 mm. of mercury followed by infrared spectroanalysis of the fractions showed that the crude ester was 2–4% hydrocarbons, 5–10% alpha geranyl acetate plus alpha neryl acetate, 65–70% 2-chloro-dihydrogeranyl acetate plus 2-chloro-dihydroneryl acetate and 15–20% other chlorides (alphaterpinyl chloride plus 2,8-dichloro-paramenthane).

The 2-chloro-dihydrogeranyl acetate plus 2-chlorodihydroneryl acetate fractions were combined and stirred with an equal weight of water and 1.5 moles of calcium hydroxide at 85–90° C. for 24 hours. The mixture was then filtered to remove unreacted lime and the filtrate was extracted with ether. Removal of ether followed by fractionation of the ether extract at one to two mm. of mercury and infrared spectroanalysis of the fractions indicated that the ether extract was 5–10% alpha geraniol plus alpha nerol and 85–90% 2,6-dimethyl-6-octene-2,8-diol (hydroxy-dihydro-geraniol plus hydroxy-dihydro-nerol). The hydroxy-dihydro-geraniol and hydroxy-dihydro-nerol were identified by catalytically hydrogenating them to the known compound hydroxy-dihydro-citronellol.

EXAMPLE 8 d-Limonene was chlorinated at 55–60° C. in the presence of 1.25 moles of sodium bicarbonate. The chlorination product was 5–10% alpha terpinyl chloride, 80–85% carvyl chloride and 10–15% dichlorides. Most of the dichloride is 8-chloro-carvotanacetyl chloride. Five hundred (500) grams of the chlorination product, 310 grams of sodium acetate and 10 grams of triethylamine were stirred at 85–90° C. for 5 hours. The reaction mixture was washed with water to remove sodium chloride and unreacted sodium acetate to give 513 grams of crude acetate. Fractionation of the crude acetate followed by infrared spectroanalysis of the fractions indicated that it contained 5–10% hydrocarbons, 5–8% alpha terpinyl chloride, 75–80% carvyl acetate (mixture of cis- and trans-forms) and 10–12% dichlorides plus chloro terpene acetates. Most of the latter 10–12% fraction is 8-chloro carvotanacetyl acetate.

EXAMPLE 9

3-menthene (76%, remainder largely 2-menthene) was chlorinated with about 0.75 moles chlorine to produce a product rich in 5-chloro-3-menthene. The 2-menthene was largely unaffected. Portions of this crude product containing about 70–75% of the allylic chloride was treated with 1.25 moles of sodium acetate per mole of halide and 10% of a nitrogen base calculated on the weight of the crude chloride. The mixtures were heated with agitation for eight hours at 90–95° C. Analyses of the reaction products were made by chemical and instrumental means on the crude water washed product and showed the percent ester in the crude product. Also, the crude esters were saponified to the corresponding alcohols, the cis and trans forms of 3-menthene-5-ol and the percent of each of these in the total alcohol mixture was analyzed by vapor phase chromatography. The results are shown in Table II below.

*Table II*

| Nitrogen Base or Salt | Percent Ester In Crude Washed Reaction Product | Percent Trans Alcohol | Percent Cis Alcohol |
| --- | --- | --- | --- |
| None | 12 | 74 | 26 |
| ammonium chloride | 21 | 71 | 29 |
| acetamide | 46 | 69 | 31 |
| urea | 50 | 69 | 31 |
| guanidine | 50 | 71 | 29 |
| brucine | 65 | 64 | 36 |
| ammonium acetate | 35 | 66 | 34 |
| hydroxylamine | 35 | 66 | 34 |
| acetamidine | 40 | 65 | 35 |

In addition, the same reaction was carried out but using sodium chloracetate instead of sodium acetate and with dimethyl glyoxime as nitrogen base catalyst. A yield of 50% 3-menthenyl chloracetate was produced. Ratio of trans/cis alcohols obtained on saponification was 74/26.

Similarly prepared menthenyl bromide without catalyst gave 6% ester with sodium acetate under the same conditions and 20% ester in the presence of 3% triethylamine based on the weight of the bromide taken. The ratio of trans/cis alcohols in the two reactions was 78/22 and 65/35 respectively.

Carvyl bromide agitated with 1.25 moles sodium acetate and no catalyst at 90–95° C. gave 5% ester and under the same conditions but in the presence of 3% triethylamine based on the weight of the bromide gave 50% carvyl acetate.

Carvyl chloride treated like the bromide above gave 10% ester with no catalyst and 26% ester when 10% by weight phenylsemicarbazide was used based on the weight of the starting chloride.

EXAMPLE 10

Crude myrcene (beta pinene pyrolysate containing about 75% myrcene) was hydrochlorinated with one mole of hydrogen chloride per 136 grams of pyrolysate in the presence of 0.5% cuprous chloride. Portions of this product were reacted with good agitation with 1.25 equivalents of various salts of carboxylic acids for 8 hours at 90–95° C. in the presence or absence of catalysts. After washing out the water-soluble materials, the crude esters were analyzed by chemical and instrumental means. The crude esters were saponified and the oils were cohobated then analyzed for the identity and quantity of the alcohols. Individual alcohol composition is expressed as percent of that alcohol to total alcohols in Table III below. Analysis was by vapor phase chromatography.

*Table III*

| Salt of Carboxylic Acid | Percent and Identity of Catalyst | Percent Ester In Washed Oil Product | Percent Composition of Alcohols Produced on Saponification | | | | Remarks |
| --- | --- | --- | --- | --- | --- | --- | --- |
| | | | Linalool | Nerol | Geraniol | Terpineol | |
| Lead Acetate Trihydrate | None | [1] 57 | 41 | 5.6 | 26 | 27 | Considerable solvolytic reaction due to presence of water of crystallization. Nonetheless, much improvement in yield due to amine catalyst. |
| | 10% Triethylamine | [1] 76 | 37 | 10 | 31 | 22 | |
| Cupric Acetate Monohydrate | None | Polymer | | | | | Poor results, but amine causes substantial improvement. |
| | 10% Triethylamine | 17 | 4 | 11 | 21 | 65 | |
| Nickel Formate | None | Polymer | | | | | Amine improves results, but results poor. |
| | 10% Triethylamine | 7 | | | | | |
| Sodium Oxalate (Neutral) | None | 2 | | | | | Very substantial improvement attributable to amine. |
| | 10% Triethylamine | 35 | | 43 | 57 | | |
| Sodium fumarate | None | 10 | | | | 100 | Excellent improvement with amine, which also suppresses cyclization. |
| | 10% Triethylamine | 60 | 12 | 33 | 51 | 4 | |
| Sodium salt of Crude Tall Oil | None | [2] 62 | 80 | 5 | 9 | 6 | Addition of amine shows strong effect of amine catalysis on the composition of the product. Both fatty and rosin acids were esterified. |
| | 10% Triethylamine | [2] 65 | 25 | 23 | 35 | 17 | |
| Aluminum Acetate | 10% Triethylamine | 10 | 9 | 41 | 45 | 5 | Poor yield but without amine only polymer results. |
| Calcium Salt of Tall Oil Fatty Acids | None | None | | | | | In absence of amine there is little reaction. Amine very beneficial. |
| | 10% Triethylamine | 22 | 16 | 27 | 35 | 22 | |

[1] Alcohol plus ester (hydrolysis during reaction).
[2] Percent alcohols recovered on saponification.

EXAMPLE 11

The same myrcene hydrochloride used in Example 10 was washed free of cuprous chloride. It was then agitated with 1.25 moles ammonium acetate at 90–95° C. for 8 hours. (See copending application Serial No. 760,833, filed September 15, 1958.) A duplicate experiment was run, but 10% triethylamine was added, based on the weight of the starting washed hydrochloride. Still another experiment was run in the same way, but 5% cuprous chloride (see copending application Serial No. 760,844, filed September 15, 1958) was added instead of triethylamine. The samples were washed up after the reaction and analyzed as in Example 10.

| Catalyst | Percent Ester | Percent Linalool | Percent Nerol | Percent Geraniol | Percent Terpineol |
|---|---|---|---|---|---|
| None | 45 | 19 | 22 | 48 | 11 |
| 10% Amine | 50 | 5 | 41 | 49 | 5 |
| 5% Cuprous Chloride | 70 | 81 | 11 | 7 | 1 |

It is evident that while ammonium acetate gives good results alone and acts both as catalyst and reagent, that addition of free amine increases the yield appreciably, suppresses linalyl ester formation, increases neryl ester substantially and suppresses terpineol formation. The experiment using the amine catalyst was repeated exactly except that triethylammonium acetate was used as reagent. The ester yield was 55% and the alcohols produced on saponification were 6% linalool, 44% nerol, 46% geraniol, 5% terpineol, very similar to the results from ammonium acetate plus free amine.

It is evident from the cuprous chloride catalyzed experiment that this catalyst is capable of producing very high yields of linalyl ester even in the presence of much ammonium salt and should not be present in myrcene hydrochloride used in amine catalyzed systems unless the system is very strongly amine catalyzed by use of large quantities of amine and/or unless a salt such as sodium carbonate is present that is capable of destroying the cuprous chloride in nonacidic systems. The whole catalysis problem may be avoided best by destroying the cuprous chloride in the crude hydrochloride by washing, filtering or adding sodium carbonate and the like, then removing the cooper compound.

EXAMPLE 12

Myrcene hydrochloride produced as in Example 10 was washed to remove cuprous chloride used in its production. It was then agitated with 1.25 moles sodium acetate plus 3% triethylamine and 5% acetic acid, based on the weight of hydrochloride taken, for eight hours at 90–95° C. The washed crude product was 55% ester and the alcohols obtained on saponification were 5% linalool, 36% nerol, 49% geraniol and 10% terpineol.

EXAMPLE 13

Myrcene hydrochloride was prepared according to the prior art and in the absence of cuprous chloride. Such myrcene hydrochloride contains the unwanted 2-chloro-2-methyl-6-methylene-7-octene because in the absence of cuprous chloride during hydrochlorination, the addition of HCl takes place both at the conjugate system and at the isolated double bond. This myrcene hydrochloride is much richer in linalyl chloride and poorer in geranyl chloride than when cuprous chloride is added and linalyl is isomerized to geranyl chloride. Portions of this hydrochloride were treated with 1.25 moles sodium acetate with agitation and with and without 10% triethylamine catalyst. The following are the results obtained.

| Catalyst | Percent Ester | Percent Linalool | Percent Nerol | Percent Geraniol | Percent Terpineol | Percent 2-hydroxy-2-methyl-6-methylene-7-octene |
|---|---|---|---|---|---|---|
| Yes | 45 | 25 | 15 | 31 | 24 | 5 |
| No | 26 | 37 | 8 | 32 | 18 | 5 |

The higher proportions of linalool in the total alcohols is indicative of the higher linalyl chloride content of the hydrochloride. The amine not only catalyzes the reaction, but suppresses neryl chloride/neryl acetate loss.

EXAMPLE 14

Small capsule reactions were run using myrcene hydrochloride prepared in the presence of 0.5% cuprous chloride with 1.25 equivalents of various salts and in the presence or absence of 10% triethylamine. These capsules were not agitated and apparently this was responsible for the somewhat unsatisfactory yields though the experiments were successful in showing the utility of the catalyst. Table IV shows the results.

Table IV

| Salt | Cayalyst | Percent Ester | Composition of Alcohols in Saponified Product | | | |
|---|---|---|---|---|---|---|
| | | | Percent Linalool | Percent Nerol | Percent Geraniol | Percent Terpineol |
| Sodium 2-Furoate | No | 25 | 35 | 10 | 25 | 30 |
| Sodium 2-Furoate | Yes | 60 | 14 | 29 | 47 | 10 |
| Trisodium Citrate | No | 8 | 67 | | | 33 |
| Trisodium Citrate | Yes | 25 | 20 | 29 | 42 | 9 |
| Sodium Tartrate | No | 3 | 65 | | | 35 |
| Sodium Tartrate | Yes | 8 | 63 | | 9 | 28 |
| Sodium Phthalate | No | 21 | 35 | 11 | 28 | 26 |
| Sodium Phthalate | Yes | 35 | 32 | 19 | 36 | 13 |

EXAMPLE 15

One hundred and thirty-six (136) grams of alpha terpinene (95%) was reacted with 36.5 grams of anhydrous HCl at 15–25° C. Infrared spectroanalysis of the hydrochlorination product indicated that it was a mixture of 1-chloro-2-menthene and 4-chloro-2-menthene. The hydrochlorination product (85 grams), 50 grams of anhydrous sodium acetate and 2.5 grams of triethylamine were stirred at 75–80° C. for 8 hours. The reaction mixture was washed to yield 75 grams of crude ester. Infrared spectroanalysis of the crude ester indicated that it was 50–55% hydrocarbons (a mixture of menthadienes) and 20–25% ester (mixture of piperityl acetate and carvenyl acetate).

Eighty-five (85) grams of the above hydrochlorination product and 50 grams of anhydrous sodium acetate and no nitrogen base catalyst were stirred at 75–80° C. for 8 hours to give a product that analyzed 75–80% hydrocarbons and only 5–10% esters.

EXAMPLE 16

Four hundred and eight (408) gram portions of alpha pyronene and beta pyronene were each reacted with 109.5 grams of anhydrous HCl at 15–25° C. Infrared spectro-analysis of the hydrochlorination products showed that alpha and beta pyronene gave the same hydrochlorination product. Dehydrochlorination of the hydrochlorination products by refluxing with 50% KOH in methanol gave 1,1,2-trimethyl-3-methylene-4-cyclohexene containing a small amount of α and β pyronene. From the above data it is evident that the hydrochlorination products were predominately 3-chloro-1,1,2,3-tetramethyl-4-cyclohexene.

One hundred and seventy-four (174) grams of the above hydrochloride, 103 grams of anhydrous sodium acetate and 4 grams of triethylamine were stirred at 85–90° C. for 8 hours. The reaction mixture was washed with water to remove the sodium chloride and unreacted sodium acetate. One hundred eighty-two (182) grams of crude ester (50–55% ester) was obtained. Infrared spectronanalysis of the product obtained by saponifying the crude ester indicated that it was predominately a secondary alcohol as shown by the intensity of the characteristic secondary alcohol absorption at about 9.8 μ. The alcohol was probably 5-hydroxy-1,1,2,3-tetramethyl-3-cyclohexene. When the chloride is reacted in the absence of amine, the yield of ester is very poor and if the reaction is forced at higher temperatures, dehydrochlorination becomes the major reaction.

EXAMPLE 17

Eight tenths of a mole of hydrogen chloride is passed into 136 grams of beta pinene pyrolysate containing about 74–76% by weight myrcene and in the presence of one gram cuprous bromide as the reaction mixture is held at 20–25° C. by cooling. There results a crude hydrochlorination product containing about 75–80% saponifiable chlorides, chiefly geranyl and neryl, along with some linalyl chloride and traces of terpinyl chloride. The remainder of the product is largely limonene and other hydrocarbons which are inert solvents. The crude hydrochloride is treated with 2% soda ash and washed. It is then added to one mole of sodium butyrate and 5 grams triethylamine and the whole is agitated at 60 to 70° C. for two hours, then at 100–110° C. for four hours. The product is cooled, washed with water and fractionated at 2 to 5 mm. pressure to remove successive fraction of hydrocarbons (rich in limonene), linalyl butyrate, terpinyl butyrate and finally geranyl/neryl butyrate. The yield of linalyl butyrate is about 10%, terpinyl butyrate is about 1 to 3% and geranyl/neryl butyrate about 75 to 80%, based on the theoretical yield from the myrcene in the crude pyrolysate. The amine catalyst may be recovered partly from the first fraction of the distillation, partly from the aqueous wash of the crude reaction product. The aqueous wash is made alkaline and distilled to collect the amine-water azeotrope which can be reused in the next batch as catalyst.

If it is desired merely to produce alcohols, the crude ester can be saponified with aqueous alkali at about 90 to 105° C. and the whole saponification mixture can be cohobated and fractions of distillate collected. Most of the amine used can be recovered from fractionation of the early steam distillate cuts and useful separations are made by cohobation of hydrocarbons (early cuts) to geraniol/nerol rich cuts (90 to 95% geraniol/nerol in the last 10 to 15% of oils distilled).

EXAMPLE 18

Myrcene hydrochloride produced in presence of cuprous chloride and rich in geranyl chloride was treated with 1.25 moles sodium acetate and in the presence or absence of 0.1% triethylamine for 88 hours at 90–95° C. with agitation.

| Catalyst | Percent Ester | Composition of Alcohols From Saponified Ester | | | |
|---|---|---|---|---|---|
| | | Linalool | Nerol | Geraniol | Terpineol |
| None | 55 | 31 | 17 | 36 | 16 |
| 0.1% Triethylamine | 62 | 17 | 28 | 43 | 12 |

EXAMPLE 19

One mole of alpha terpineol (96+%) was chlorinated with one mole of chlorine at 35–40° C. in the presence of 1.25 moles of sodium bicarbonate. The chlorination mixture was filtered to remove inorganic salts. Infrared spectroanalysis of the chlorination product showed that it was 85–90% 6-chloro-8-hydroxy-1-menthene. One hundred and ninety (190) grams of the chlorination product, 102 grams of anhydrous sodium acetate and 10 grams of triethylamine were stirred at 90–95° C. for 8 hours. The reaction mixture was washed with water to yield 190 grams of crude ester. Analysis of the crude ester showed that it was 61% 8-hydroxy-1-menthenyl-6-acetate. When the above reaction was repeated without triethylamine present, the crude ester obtained contained 24% 8-hydroxy-1-menthenyl-6-acetate. Saponification of the ester yields sobrerol.

EXAMPLE 20

One mole of alpha pyronene (90+%) was chlorinated with one mole of chlorine at 25–30° C. in the presence of 1.25 moles of sodium bicarbonate. The chlorination product was filtered to remove inorganic salts. One hundred and seventy-two grams of the filtered chlorination product, 102 grams of anhydrous sodium acetate and 7 grams of triethylamine were stirred at 90–95° C. for 8 hours. The reaction mixture was then washed with water to yield 174 grams of crude ester. Analysis of the crude ester showed that it was 46% allylic acetates. When the reaction was repeated without using triethylamine, the crude ester obtained contained only 26% allylic acetates.

EXAMPLE 21

One mole of beta pyronene (92+%) was chlorinated with one mole of chlorine at 25–30° C. in the presence of 1.25 moles of sodium bicarbonate. The chlorination mixture was filtered to remove inorganic salts. One hundred and seventy-two (172) grams of the filtered chlorination product, 102 grams of anhydrous sodium acetate and 7 grams of triethylamine were stirred at 90–95° C. for 8 hours. The reaction product was washed with water to yield 175 grams of crude ester. Analysis of the crude ester showed that it contained 37% allylic acetates. When the reaction was repeated without triethylamine, the crude ester obtained contained 18% allylic acetates.

EXAMPLE 22

One mole of a terpene fraction (boiling range 170–190° C., a mixture of menthadienes resulting from acid isomerization of pinenes and containing alpha terpinene, 2,4(8)p-menthadiene, limonene, gamma terpinene and terpinolene) was chlorinated at 25–30° C. with one mole of chlorine in the presence of 1.25 moles of sodium bicarbonate. The chlorination product was filtered to remove inorganic salts. One hundred and seventy-two (172) grams of the filtered mono-chlorination product, 102 grams of anhydrous sodium acetate and 7 grams of triethylamine were stirred at 90–95° C. for 8 hours. The reaction mixture was then washed with water to yield 173 grams of crude ester. Analysis of the crude ester showed that it contained 45% secondary allylic acetates. When the above reaction was repeated without triethylamine, the crude ester obtained contained 17% secondary allylic acetates.

EXAMPLE 23

One mole of dihydromyrcene (2,6-dimethyl-2,6-octadiene) was chlorinated with one mole of chlorine at 25–30° C. in the presence of 1.25 moles of sodium bicarbonate. The chlorination product was filtered to remove inorganic salts. One hundred and seventy-four (174) grams of the filtered product, 102 grams of anhydrous sodium acetate and 7 grams of triethylamine were stirred at 90–95° C. for 8 hours. The reaction mixture was then washed with water to yield 173 grams of crude ester. Analysis of the crude ester showed that it contained 24% 2,6-dimethyl-1,6-octadienyl-3-acetate and 9% 2,6-dimethyl-2,6-octadienyl-1-acetate. Saponification of the acetates yields the corresponding alcohols which are described in copending application Serial No. 743,022, filed June 19, 1958. When the above reaction was repeated without triethylamine, the crude ester obtained contained 12% acetates.

EXAMPLE 24

One mole of beta pinene pyrolysate (75% myrcene) containing 0.5% by weight of cuprous chloride was chlorinated with one mole chlorine at 20–25° C. The chlorination product was filtered and washed to remove cuprous chloride. Infrared spectroanalysis of the filtered chlorination product showed that it was 55–60% 3,8-dichloro-2,6-dimethyl-1,6-octadiene. Two hundred and six (206) grams of the washed chlorination product, 206 grams of anhydrous sodium acetate and 6 grams of triethylamine were stirred at 90–95° C. for 8 hours. The reaction mixture was washed to yield 209 grams of crude ester. Analysis of the crude ester indicated that it contained 5–10% 2,6-dimethyl-1,7-octadienyl-3,6-diacetate and 35–40% 2,6-dimethyl-1,6-octadienyl-3,8-diacetate. It is likely that small quantities of the two possible allylic isomers of the specified esters are also present. When the above reaction was repeated without an amine present, the crude ester obtained 15% diacetates.

In this example, the chlorine is shown to attack the 3-position of myrcene (2-methyl-6-methylene-2,7-octadiene) and in the addition of the disengaged hydrogen chloride to the conjungate portion of the molecule to produce the diallylic chloride which is converted then to the mixture of diallylic terpenic diacetates.

EXAMPLE 25

One mole of alloocimene (97+%) was chlorinated with one mole of chlorine at 20–25° C. in the presence of 1.5 moles of sodium bicarbonate. The chlorination product was filtered to remove inorganic salts. Infrared spectroanalysis of the chlorination product showed that it was 3-chloro-2,6-dimethyl-1,4,6-octatriene. One hundred and seventy-two (172) grams of the filtered chlorination product, 102 grams of anhydrous sodium acetate and 7 grams of triethylamine were stirred at 90–95° C. for 8 hours. The reaction mixture was then washed to yield 172 grams of crude ester. Analysis of the crude ester indicated that it was 40-45% 2,6-dimethyl-1,4,6-octatrienyl-3-acetate and 8–10% other allylic acetates. When the reaction was repeated without an amine catalyst, the crude ester obtained contained only 15–18% allylic acetates and contained much polymeric materials.

EXAMPLE 26

An ocimene rich fraction (75% ocimene, 15% myrcene and 10% limonene) was reacted with anhydrous HCl at 0–10° C. in the presence of 0.5% cuprous chloride (based on the ocimene rich fraction). Thirty-six (36) grams of anhydrous HCl was used for each 136 grams of ocimene rich fraction. The resulting hydrochloride was filtered and washed to remove the cuprous chloride. One hundred (100) grams of the above hydrochlorination product, 60 grams of anhydrous sodium acetate, and 5 grams of triethylamine were stirred at 90–95° C. for 8 hours. The reaction mixture was then washed with water to yield 104 grams of crude ester. Aanalysis of the crude ester showed that it contained 54% allylic acetates (a mixture of linalyl acetate, geranyl acetate, neryl acetate) and other allylic acetates. When the reaction was repeated without an amine catalyst, the crude ester obtained contained 15% allylic acetates.

EXAMPLE 27

One mole of 2,6-dimethyl-2,6-octadiene was chlorinated with two moles of chlorine at 25–35° C. and in the presence of two and a half moles sodium bicarbonate. The crude dichloride was filtered to remove inorganics, then treated with three moles sodium acetate and ten grams triethylamine. The mixture was heated at 120–130° C. with agitation for 4 hours. The crude ester was saponified with excess alcoholic potassium hydroxide to yield a mixture of alcohols which was largely 2-methyl-6-methylene-1-octenyl-3,7-diol. When the chlorination is conducted at 80–90° C. there is produced a different mixture of diallylic chlorides so that the alcohols resulting from the described process are rich in cis- trans isomers of the named glycol. These include 2-methyl-6-methylene-2-octenyl-1,7-diol; 2-methyl-6-methylol-1,6-octadienyl-3-ol; 2,6-dimethyl-2,5-octadienyl-1-ol; 2,6-dimethyl-2,5-octadienyl-3,7-diol; 2,6-dimethyl-2,5-octadienyl-1, 7-diol; 2,6-dimethyl-1,6-octadienyl-3,5-diol; 2,6-dimethyl-2, 6-octadienyl-1,5-diol.

These compounds and their hydrogenated derivatives have special values for further synthesis of products useful for emulsifiers, plasticizers, and terpenic oxygenated products valuable in perfumery.

When no amine catalyst is present poor yields, about 10–15% diacetates are produced whereas in presence of the catalyst about 65% diacetate is present in the crude ester. Some chloro acetate will also result from incomplete reaction of the diallylic chloride and also some vicinal dichlorides will be present.

Resort can be had to modifications falling within the spirit of my invention and the scope of the appended claims.

Having thus described my invention, I hereby claim:

1. An improved process for preparing terpene allylic esters which comprises subjecting a terpene allylic halide, other than a mycenehydrohalide, in which the halogen is selected from the class consisting of chlorine and bromine, to a displacement reaction by treatment with a carboxyllic acid salt under nonaqueous conditions in the presence of a nitrogen base catalyst, said catalyst being a nitrogen containing compound capable of adding HX where X is a halide radical.

2. The process of claim 1 in which the nitrogen base catalyst has an organic radical attached to a nitrogen atom of the base through a carbon atom of said organic radical.

3. The process of claim 1 in which the terpene allylic halide is a chloride and the nitrogen base is an amine.

4. The process of claim 1 in which the carboxylic acid salt is a metal salt.

5. In a process for preparing esters of terpene compounds wherein an allylic terpene halide, in which the halogen is selected from the group consisting of chlorine and bromine, is subjected to a displacement reaction by treatment with a carboxylic acid salt under nonaqueous conditions, the improvement which consists essentially in effecting said displacement reaction in the presence of a nitrogen base catalyst, said catalyst being a nitrogen compound capable of adding HX, where X is a halide radical, and possessing an organic radical attached to the nitrogen atom of the base through a carbon atom of said radical.

6. The process of claim 1 in which the nitrogen base catalyst is an amine.

7. The process of claim 1 in which the carboxylic acid salt is a metal salt.

8. The process of claim 1 in which the carboxylic acid salt is an alkyl ammonium salt.

9. The process of claim 1 in which the salt is a metal salt and the nitrogen base catalyst is an amine.

10. In a process for preparing esters of terpene compounds wherein an allylic terpene halide, in which the halogen is selected from the class consisting of chlorine and bromine, is subjected to a displacement reaction by treatment with a carboxylic acid salt under nonaqueous conditions, the improvement which consists essentially in effecting said displacement reaction in the presence of a nitrogen base catalyst, said catalyst being a different compound than said carboxylic acid salt and being a compound capable of adding HX where X is a halide radical.

11. The process of claim 10 in which the carboxylic acid salt is a metal salt.

12. The process of claim 10 in which the nitrogen base catalyst is an amine.

13. In a process for preparing esters of acyclic terpene compounds wherein an acyclic allylic terpene chloride is subjected to a displacement reaction by treatment with a carboxylic acid salt under nonaqueous conditions, the improvement which consists essentially in effecting the displacement in the presence of a nitrogen base catalyst, said catalyst being a different compound than a carboxylic acid salt and being a compound capable of adding HX where X is a halide radical.

14. In a process for producing geranyl esters wherein myrcene monohydrochloride is subjected to a displacement reaction by treatment with a carboxylic acid salt under nonaqueous conditions, the improvement which consists essentially in effecting the displacement reaction in the presence of a nitrogen base catalyst, said catalyst being a different compound than said carboxylic acid salt and being a compound capable of adding HX where X is a halide radical.

15. The process of claim 13 in which the nitrogen base is an amine.

16. The process of claim 13 in which the salt is a metal salt.

17. The process of claim 13 in which the salt is a metal salt and the nitrogen base is an amine.

18. In a process for producing geranyl esters wherein myrcene monohydrobromide is subjected to a displacement reaction by treatment with a carboxylic acid salt under nonaqueous conditions the improvement, which consists essentially in effecting the displacement in the presence of a nitrogen base catalyst, said catalyst being a different compound than said carboxylic acid salt and being a compound capable of adding HX where X is a halide radical.

19. An improved process for preparing acyclic terpene allylic esters which comprises subjecting an acyclic terpene allylic chloride other than a myrcene hydrochloride, to a displacement reaction by treatment with a carboxylic acid salt under nonaqueous conditions in the presence of a nitrogen base catalyst, said catalyst being a nitrogen containing compound capable of adding HX where X is a halide radical.

20. An improved process for preparing cyclic terpene allylic esters which comprises subjecting a cyclic terpene allylic chloride to a displacement reaction by treatment with a carboxylic acid salt under nonaqueous conditions in the presence of a nitrogen base catalyst, said catalyst being a nitrogen containing compound capable of adding HX where X is a halide radical.

21. The process of claim 20 in which the chloride is a monocyclic compound.

22. The process of claim 20 in which the chloride is a derivative of p-menthane.

23. The process of claim 20 in which the chloride is carvyl chloride.

24. An improved process for preparing cyclic terpene allylic esters which comprises subjecting a cyclic terpene allylic bromide to a displacement reaction by treatment with a carboxylic acid salt under nonaqueous conditions in the presence of a nitrogen base catalyst, said catalyst being a nitrogen compound capable of adding HX where X is a halide radical.

25. The process of claim 24 in which the bromide is carvyl bromide.

26. The process of claim 20 in which the chloride is an allylic chloride derivative of 1,1,2,3-tetramethyl cyclohexane.

27. The process of claim 20 in which the chloride is a pinene chloride.

References Cited in the file of this patent

UNITED STATES PATENTS

| | | |
|---|---|---|
| 2,062,917 | Lawson | Dec. 1, 1936 |
| 2,609,388 | Knapp et al. | Sept. 2, 1952 |
| 2,794,826 | Bell et al. | June 4, 1957 |

FOREIGN PATENTS

| | | |
|---|---|---|
| 544,032 | Canada | July 23, 1957 |

OTHER REFERENCES

Roberts et al.: J. Am. Chem. Soc. 64, 2157–2164 (1942).

Goering et al.: J. Am. Chem. Soc. 77, 4042–4048 (1955).

De Wolfe et al.: Chem. Rev. 56, 833–846 (1956).